(12) United States Patent
Suzuki

(10) Patent No.: US 9,438,142 B2
(45) Date of Patent: Sep. 6, 2016

(54) MOTOR DRIVING CIRCUIT

(71) Applicant: MEIDENSHA CORPORATION, Tokyo (JP)

(72) Inventor: Tetsuji Suzuki, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 14 days.

(21) Appl. No.: 14/414,978

(22) PCT Filed: Jul. 23, 2013

(86) PCT No.: PCT/JP2013/069920
§ 371 (c)(1),
(2) Date: Jan. 15, 2015

(87) PCT Pub. No.: WO2014/017487
PCT Pub. Date: Jan. 30, 2014

(65) Prior Publication Data
US 2015/0222206 A1    Aug. 6, 2015

(30) Foreign Application Priority Data

Jul. 23, 2012   (JP) .................................. 2012-162472

(51) Int. Cl.
*H02P 1/00*    (2006.01)
*H02P 3/14*    (2006.01)
*H02P 29/02*   (2016.01)
(Continued)

(52) U.S. Cl.
CPC ............... *H02P 3/14* (2013.01); *B60L 3/0046* (2013.01); *H02H 11/002* (2013.01); *H02P 29/02* (2013.01); *H02J 7/0063* (2013.01); *H02M 1/32* (2013.01); *H02M 7/797* (2013.01); *Y02T 10/642* (2013.01)

(58) Field of Classification Search
CPC ........... Y02T 10/7005; Y02T 10/7077; Y02T 10/70; B60W 10/08; B60W 20/00
USPC ......................................................... 318/139
See application file for complete search history.

(56) References Cited

U.S. PATENT DOCUMENTS

2004/0204088 A1*  10/2004  Dearn ....................... G05F 1/46
                                                        455/558
2010/0067152 A1*   3/2010  Nakahashi ............... H02M 1/32
                                                        361/18
(Continued)

FOREIGN PATENT DOCUMENTS

JP          7-212965 A       8/1995
JP          8-111902 A       4/1996
(Continued)

*Primary Examiner* — Kawing Chan
*Assistant Examiner* — Bradley Brown
(74) *Attorney, Agent, or Firm* — Foley & Lardner LLP

(57) ABSTRACT

A main control circuit (11) for driving a motor is configured so as to have: a Pch FET (T11), which is provided in series with a diode (D1), and the source (S) of which is connected to a secondary-side contact (MC2) of a main contactor (MC) while the drain (D) is connected to the anode (A) of the diode (D1); and a gate voltage generation circuit (12) for the Pch FET (T11). The gate voltage generation circuit is formed so as to have a first resistor (R11), one end (R11$a$) of which is connected to the source (S) of the Pch FET (T11), and the other end (R11$b$) of which is connected to the gate (G) of the Pch FET (T11), and a second resistor (R12), one end (R12$a$) of which is connected to the gate (G) of the Pch FET (T11) and the other end (R12$b$) of which is connected to the negative-electrode-side line (L2) of a battery.

4 Claims, 9 Drawing Sheets

(51) Int. Cl.
    *H02H 11/00*     (2006.01)
    *B60L 3/00*     (2006.01)
    *H02M 1/32*     (2007.01)
    *H02M 7/797*     (2006.01)
    *H02J 7/00*     (2006.01)

(56) References Cited

U.S. PATENT DOCUMENTS

2010/0090628 A1*   4/2010   Endo .................... B60L 3/0046
                                                                     318/400.3

2013/0038251 A1*   2/2013   Fukuoka ................. H02H 3/18
                                                                       318/139

FOREIGN PATENT DOCUMENTS

| | | |
|---|---|---|
| JP | 9-56167 A | 2/1997 |
| JP | 2001-339982 A | 12/2001 |
| JP | 2002-95159 A | 3/2002 |
| JP | 2003-37933 A | 2/2003 |
| JP | 2004-328892 A | 11/2004 |
| JP | 2005-224088 A | 8/2005 |

* cited by examiner

MOTOR DRIVING CIRCUIT

TECHNICAL FIELD

The present invention relates to a motor driving circuit and is used as a motor-drive main control circuit for an automated guided vehicle and the like.

BACKGROUND ART

Automated guided vehicles are configured to transport parts, products, small objects, and the like at worksites such as factories, warehouses, and offices. Among these automated guided vehicles, there have been one configured to travel along a guide line such as an electric line or light reflective tape, an autonomous travel-type requiring no such guide line, and the like.

Meanwhile, these automated guided vehicles are each equipped with a motor for traveling, a motor-drive main control circuit for supplying power to the motor to operate the motor, and the like.

FIG. 5 is a configuration diagram of a conventional motor-drive main control circuit for an automated guided vehicle. FIG. 5 shows a state where the positive electrode and the negative electrode of a battery are connected normally.

As shown in FIG. 5, a conventional motor-drive main control circuit 1 for an automated guided vehicle includes a battery Batt, a main contactor MC, a motor main control circuit section 2, a battery-positive-electrode-side line L1, a battery-negative-electrode-side line L2, a diode D1, and a voltage smoothing capacitor C1.

The battery Batt is a power source of a DC motor M for travel of an automated guided vehicle and is configured such that a DC voltage of about 12 V to 72 V can be obtained.

The DC motor M is connected to the motor main control circuit section 2. The motor main control circuit section 2 is a circuit configured to be capable of forward and reverse energization of the DC motor M by means of multiple FETs or bipolar transistors so as to realize forward and reverse operation of the DC motor M, and is generally called an H-bridge circuit.

This H-bridge motor main control circuit section 2 is generally configured such that the ON-OFF states (conductive-non-conductive states) of its FETs or bipolar transistors are controlled to perform chopper operation so that the level of the voltage to be applied to the DC motor M can be made variable and therefore the current for energizing the DC motor M and the number of rotations thereof can be made variable.

As a specific example, FIG. 5 shows a configuration of the motor main control circuit section 2 using four Nch FETs T1 to T4. The Nch FET T1 and Nch FET T2 are provided in series, and a source S of the Nch FET T1 and a drain D of the Nch FET T2 are connected at a node 2a. On the other hand, the Nch FET T3 and the Nch FET T4 are provided in series, and a source S of the Nch FET T3 and a drain D of the Nch FET T4 are connected at a node 2b. Moreover, a drain D of the Nch FET T1 and a drain D of the Nch FET T3 are connected at a node 2c, and a source S of the Nch FET T2 and a source S of the Nch FET T4 are connected at a node 2d.

The voltage to be applied between the source S and a gate G of each of the Nch FETs T1 to T4 is controlled by means of a gate voltage generation circuit (not shown) of each of the Nch FETs T1 to T4 to control the ON-OFF state of each of the Nch FETs T1 to T4 (the conductive-non-conductive state between the source S and the drain D) and thereby perform chopper operation. As a result, the level of the voltage to be applied to the DC motor M is made variable and therefore the current for energizing the DC motor M and the number of rotations thereof are made variable. Moreover, the Nch FETs T1 to T4 include parasitic diodes D11 to D14, respectively. When the energy of the DC motor M is to be regenerated to the battery Batt, these parasitic diodes D11 to D14 function as backward diodes (free-wheel diodes).

The DC motor M is connected at one end M1 to the node 2a of the Nch FETs T1 and T2 and connected at the other end M2 to the node 2b of the Nch FETs T3 and T4.

The main contactor MC is provided on the battery-positive-electrode-side line L1. The battery-positive-electrode-side line L1 connects a positive electrode terminal B1 of the battery Batt and a battery-positive-electrode-side terminal 2e of the motor main control circuit section 2 (i.e. a terminal on the drain D side of the Nch FETs T1 and T3) to each other through the main contactor MC. The battery-negative-electrode-side line L2 connects a negative electrode terminal B2 of the battery Batt and a battery-negative-electrode-side terminal 2f of the motor main control circuit section 2 (i.e. a terminal on the source S side of the Nch FETs T2 and T4).

To bring the automated guided vehicle to an emergency stop, the supply of power from the battery Batt to the DC motor M needs to be securely stopped for safety, and the motor-drive main control circuit 1 is provided with the main contactor MC for this reason. Thus, to bring the automated guided vehicle to an emergency stop, this main contactor MC is opened (contacts MC1 and MC2 of the main contactor MC are opened). In this way, the supply of power from the battery Batt to the DC motor M can be securely stopped.

The diode D1 is provided on the battery-positive-electrode-side line L1 in parallel with the main contactor MC, and is connected at its cathode K to the primary-side contact MC1 of the main contactor MC (i.e. one on the positive electrode terminal B1 side of the battery Batt) and connected at its anode A to the second contact MC2 of the main contactor MC (i.e. one on the battery-positive-electrode-side terminal 2e side of the motor main control circuit section 2).

This diode D1 is a component not used during normal travel of the automated guided vehicle. The main contactor MC is closed as shown in FIG. 5 during normal travel of the automated guided vehicle. To bring this traveling automated guided vehicle to an emergency stop, the main contactor MC is opened as shown in FIG. 6. In this case, the energy of the DC motor M (inductance energy, or mechanical energy resulting from the rotation of the DC motor M) is converted into electric energy. Like 13 shown in FIG. 6, the electric energy is regenerated to the battery Batt through the backward diodes D12 and D13 of the Nch FETs T2 and T3 in the motor main control circuit section 2 (the backward diodes D11 and D14 of the Nch FETs T1 and T4 during reverse rotation of the DC motor M) and the diode D1 in this order.

If the diode D1 is not provided, the above-mentioned energy of the DC motor M is converted into electric charges and accumulated in the capacitor C1. As a result, the voltage of the capacitor C1 rises. If the energy is large, the voltage of the capacitor C1 may be overvoltage, and components forming the motor-drive main control circuit 1 (elements such as the Nch FETs) may be damaged.

As solutions to this problem, measures have heretofore been proposed such as adding a regenerative resistor to a motor-drive main control circuit, yet the simplest configuration is the configuration like the motor-drive main control circuit 1 in which the diode D1 is added.

The voltage smoothing capacitor C1 is connected at one end C1a to the battery-positive-electrode-side line L1 (i.e. the secondary-side contact MC2 of the main contactor MC and the battery-positive-electrode-side terminal 2e of the motor main control circuit section 2) and connected at the other end C1b to the battery-negative-electrode-side line L2 (the negative electrode terminal B2 of the battery Batt and the battery-negative-electrode-side terminal 2f of the motor main control circuit section 2), and thus is provided in parallel with the motor main control circuit section 2. This voltage smoothing capacitor C1 is configured to suppress voltage fluctuations due to fluctuations in the load on the power source (battery Batt) resulting from the chopper operation of the motor main control circuit section 2 (H-bridge circuit).

In the motor-drive main control circuit 1 with the above configuration, when the main contactor MC is closed (the contacts MC1 and MC2 of the main contactor MC are closed) and the Nch FETs T1 and T4 of the motor main control circuit section 2 are turned on, current flows in the forward direction like I1 shown in FIG. 5 and energizes the DC motor M, thereby rotating the DC motor M in the forward direction like R1 shown in FIG. 5. On the other hand, when the Nch FETs T2 and T3 are turned on, current flows in the reverse direction like I2 shown in FIG. 5 and energizes the DC motor M, thereby rotating the DC motor M in the reverse direction like R2 shown in FIG. 5. Moreover, the current for energizing the DC motor M and the number of rotations thereof vary due to the chopper operation of the motor main control circuit section 2 (H-bridge circuit).

PRIOR ART DOCUMENTS

Patent Documents

Patent Document 1: Japanese Patent Application Publication No. Hei 7-212965
Patent Document 2: Japanese Patent Application Publication No. Hei 9-56167
Patent Document 3: Japanese Patent Application Publication No. 2003-37933

SUMMARY OF THE INVENTION

Problems to be Solved by the Invention

However, using automated guided vehicles at a worksite such as a factory or a warehouse has the following problem.

Specifically, at a worksite such as a factory or a warehouse, when the operator connects the battery Batt to the motor main control circuit section 2 after inspection, maintenance, or the like of the automated guided vehicle, there is a problem in that he or she often connects the positive electrode and the negative electrode of the battery Batt in reverse (hereinafter, simply referred to as reverse connection as well) by mistake.

If the positive electrode and the negative electrode of the battery Batt are connected in reverse in the motor-drive main control circuit 1 including the diode D1 as shown in FIG. 7, short-circuit of the battery Batt occurs like 14 shown in FIG. 7 from the positive electrode of the battery Batt through the backward diodes D11 to D14 of the Nch FETs T1 to T4 in the motor main control circuit section 2 and the diode D1 to the negative electrode of the battery Batt. Consequently, excessively large short-circuit current flows in the motor-drive main control circuit 1, and components (elements such as the Nch FETs) and wiring materials forming the motor-drive main control circuit 1 may therefore be excessively heated and burned out.

As a circuit configuration to prevent such a problem, a configuration has been proposed in which a diode DS is provided between the battery Batt and the main contactor MC in series therewith as shown in FIG. 8. The diode DS is connected at its anode A to the positive electrode terminal B1 of the battery Batt and connected at its cathode K to the primary-side contact MC1 of the main contactor MC.

In this circuit configuration provided with the diode DS, the diode DS can prevent the flow of short-circuit current like 14 shown in FIG. 9 even when the positive electrode and the negative electrode of the battery Batt are connected in reverse as shown in FIG. 9.

However, this circuit configuration provided with the diode DS has the following problems (see FIG. 8).

(1) When the DC motor M is driven, there is always a voltage drop $V_{FS}$ at the diode DS. For this reason, there is always an energy loss of $V_{FS} \times i$ (i is the current flowing through the diode DS and the like) at the diode DS. Thus, the electric energy of the battery Batt cannot be utilized effectively.

(2) Moreover, voltage $V_{max}$ which can be applied to the DC motor M drops below voltage $V_B$ of the battery Batt by the voltage drop $V_{FS}$ at the diode DS, and therefore $V_{max}=V_B-V_{FS}$. Thus, the number of rotations of the DC motor M decreases.

(3) Further, since the diode DS generates heat due to the energy loss at the diode DS, the automated guided vehicle needs to be equipped with a component to cool the diode DS. The component therefore increases the device volume in the automated guide vehicle having a limited capacity.

(4) Furthermore, when the automated guided vehicle is brought to an emergency stop (i.e. when the main contactor MC is opened to stop the supply of power from the battery Batt to the DC motor M), the diode DS blocks the path through which to regenerate the energy of the DC motor M to the battery Batt. Thus, motor-drive main control circuit 1 may break.

In view of the above circumstances, an object of the present invention is to provide a motor driving circuit such as a motor-drive main control circuit for an automated guided vehicle capable of preventing short-circuit of a battery when the battery is connected in reverse, and also of preventing unnecessary voltage drop, and further of regenerating the energy of a motor to the battery.

Means for Solving the Problems

A motor driving circuit according to a first aspect of the invention for solving the above problems is a motor driving circuit including a battery, a contactor, a motor control circuit section to which a motor is connected and which is any one of an H-bridge circuit and a three-phase bridge circuit including a plurality of switching elements including backward diodes, a battery-positive-electrode-side line connecting a positive electrode terminal of the battery and a battery-positive-electrode-side terminal of the motor control circuit section to each other through the contactor, a battery-negative-electrode-side line connecting a negative electrode terminal of the battery and a battery-negative-electrode-side terminal of the motor control circuit section to each other, and a diode provided in parallel with the contactor, and connected at a cathode thereof to a primary-side contact of the contactor, characterized in that the motor driving circuit comprises: a Pch FET provided in series with the diode, and connected at a source thereof to a secondary-side contact of the contactor and connected at a drain thereof to an anode of the diode; and a gate voltage generation circuit for the Pch FET, the gate voltage generation circuit including a first resistor connected at one end thereof to a source of the Pch FET and connected at another end thereof to a gate of the Pch FET, and a second resistor connected at one end thereof to the gate of the Pch FET and connected at another end thereof to the battery-negative-electrode-side line.

Also, a motor driving circuit according to a second aspect of the invention is the motor driving circuit according to the first aspect of the invention, characterized in that the gate voltage generation circuit includes a capacitor provided in parallel with the first resistor, and connected at one end thereof to the source of the Pch FET and connected at another end thereof to the gate of the Pch FET.

Also, a motor driving circuit according to a third aspect of the invention is the motor driving circuit according to the first or second aspect of the invention, characterized in that the gate voltage generation circuit includes a Zener diode provided in parallel with the first resistor, and connected at a cathode thereof to the source of the Pch FET and connected at an anode thereof to the gate of the Pch FET.

Effects of the Invention

The motor driving circuit according to the first aspect of the invention can achieve the following operations and effects since it is a motor driving circuit including battery, a contactor, a motor control circuit section to which a motor is connected and which is any one of an H-bridge circuit and a three-phase bridge circuit including a plurality of switching elements including backward diodes, a battery-positive-electrode-side line connecting a positive electrode terminal of the battery and a battery-positive-electrode-side terminal of the motor control circuit section to each other through the contactor, a battery-negative-electrode-side line connecting a negative electrode terminal of the battery and a battery-negative-electrode-side terminal of the motor control circuit section to each other, and a diode provided in parallel with the contactor, and connected at a cathode thereof to a primary-side contact of the contactor, characterized in that the motor driving circuit comprises: a Pch FET provided in series with the diode, and connected at a source thereof to a secondary-side contact of the contactor and connected at a drain thereof to an anode of the diode; and a gate voltage generation circuit for the Pch FET, the gate voltage generation circuit including a first resistor connected at one end thereof to a source of the Pch FET and connected at another end thereof to a gate of the Pch FET, and a second resistor connected at one end thereof to the gate of the Pch FET and connected at another end thereof to the battery-negative-electrode-side line.

(1) Specifically, in a case where the positive electrode and the negative electrode of the battery are connected normally, when the contactor is closed, the voltage of the battery is applied to the secondary-side contact of the contactor, so that the voltage of the first resistor obtained according to the resistance ratio between the first resistor and the second resistor is applied between the source and the gate of the Pch FET and therefore gate voltage is generated between the source and the gate of the Pch FET. Thus, the ON resistance value between the source and the drain of the Pch FET decreases, and the state between the source and the drain of the Pch FET changes to an ON state (conductive state).

Accordingly, the same state as the state of the conventional motor-drive main control circuit where only the diode is connected in parallel to the main contactor is obtained. Thus, operations and effects similar to those of the conventional motor-drive main control circuit can be achieved.

Moreover, there is not any unnecessary voltage drop which occurs in the case where the diode is provided between the positive electrode terminal of the battery and the contactor, and therefore the energy loss due to this voltage drop does not occur either. Accordingly, the electric energy of the battery can be effectively utilized. In addition, the number of rotations of the motor does not decrease. Also, no cooling component is provided and the device volume does therefore not increase.

(2) Moreover, in the case where the positive electrode and the negative electrode of the battery are connected normally, when the contactor is opened while the state between the source and the drain of the Pch FET is the ON state (conductive state), the ON state (conductive state) between the source and the drain of the Pch FET is maintained. Thus, the energy of the motor can be regenerated to the battery through the backward diodes of the switching elements in the motor control circuit section, the source of the Pch FET, the drain of the Pch FET, and the diode.

(3) In a case where the positive electrode and the negative electrode of the battery are connected in reverse, when the contactor is opened, the voltage of the battery is applied to the source of the Pch FET in the forward direction and to the drain of the Pch FET in the reverse direction. Thus, the source of the Pch FET and the gate of the Pch FET are at the same potential, and no voltage is applied between the source and the gate of the Pch FET. Accordingly, the ON resistance value between the source and the drain of the Pch FET does not decrease, and the OFF state (non-conductive state) between the source and the drain of the Pch FET is maintained.

Hence, the Pch FET can block the short circuit that occurs in the conventional practice from the positive electrode of the battery through the backward diodes of the switching elements in the motor control circuit section and the diode to the negative electrode of the battery. Accordingly, it is possible to prevent excessively large short-circuit current from flowing in the motor driving circuit and excessively heating and burning out components (elements such as the switching elements) and wiring materials forming the motor driving circuit, and therefore protect the motor driving circuit.

The motor driving circuit according to the second aspect of the invention is the motor driving circuit according to the first aspect of the invention, characterized in that the gate voltage generation circuit includes a capacitor provided in parallel with the first resistor, and connected at one end thereof to the source of the Pch FET and connected at another end thereof to the gate of the Pch FET. Thus, the capacitor of the gate voltage generation circuit can prevent false firing of the Pch FET due to fluctuations in voltage between the source and the drain of the Pch FET (dV/dt).

The motor driving circuit according to the third aspect of the invention is the motor driving circuit according to the first or second aspect of the invention, characterized in that the gate voltage generation circuit includes a Zener diode provided in parallel with the first resistor, and connected at a cathode thereof to the source of the Pch FET and connected at an anode thereof to the gate of the Pch FET. Thus, the Zener diode of the gate voltage generation circuit can prevent the value of the voltage between the source and the gate of the Pch FET from exceeding the rated value.

MODE FOR CARRYING OUT THE INVENTION

Hereinbelow, an embodiment of the present invention will be described in detail with reference to the drawings.

Configuration

Figure 1:
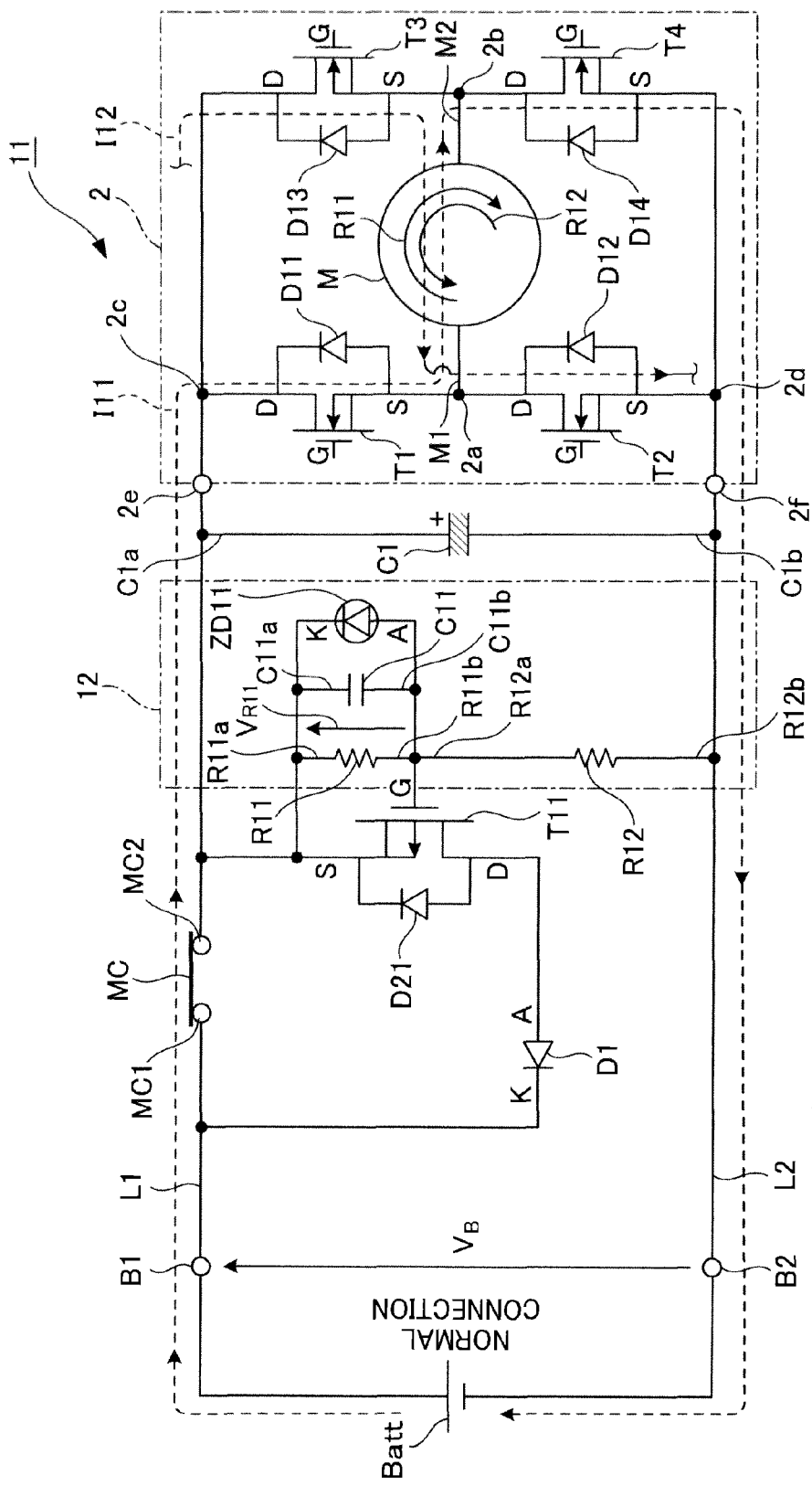
FIG. 1 is a configuration diagram of a motor-drive main control circuit for an automated guided vehicle according to an embodiment of the present invention, and is a diagram showing a state where the positive electrode and the negative electrode of a battery are connected normally and a main contactor is closed, thereby allowing the automated guided vehicle to travel.

As shown in FIG. 1, a motor-drive main control circuit 11 for an automated guided vehicle according to an embodiment of the present invention includes a battery Batt, a main contactor MC, a motor main control circuit section 2, a battery-positive-electrode-side line L1, a battery-negative-electrode-side line L2, a diode D1, a voltage smoothing capacitor C1, a Pch FET 11, and a gate voltage generation circuit 12 for the Pch FET 11.

Specifically, the motor-drive main control circuit 11 of this embodiment has a configuration which is a similar circuit configuration to that of the conventional motor-drive main control circuit 1 (see FIG. 5) and additionally includes the Pch FET T11 and the gate voltage generation circuit 12 for the Pch FET T11.

Thus, in the following, the configuration of the motor-drive main control circuit 11 of this embodiment will be described in detail with reference to FIG. 1, with portions in FIG. 1 similar to those of the conventional motor-drive main control circuit 1 (FIG. 5) being denoted by the same reference numerals.

As shown in FIG. 1, the battery Batt is a power source of a DC motor M for travel of an automated guided vehicle and is configured such that a DC voltage of about 12 V to 72 V can be obtained.

The DC motor M is connected to the motor main control circuit section 2. The motor main control circuit section 2 is a circuit configured to be capable of forward and reverse energization of the DC motor M by means of multiple switching elements (such as FETs or bipolar transistors) so as to realize forward and reverse operation of the DC motor M, and is generally called an H-bridge circuit.

This H-bridge motor main control circuit section 2 is generally configured such that the ON-OFF states (conductive-non-conductive states) of its switching elements (such as FETs or bipolar transistors) are controlled to perform chopper operation so that the level of the voltage to be applied to the DC motor M can be made variable and therefore the current for energizing the DC motor M and the number of rotations thereof can be made variable.

As a specific example, FIG. 1 shows a configuration of the motor main control circuit section 2 using four Nch FETs T1 to T4. The Nch FET T1 and Nch FET T2 are provided in series, and a source S of the Nch FET T1 and a drain D of the Nch FET T2 are connected at a node 2a. On the other hand, the Nch FET T3 and the Nch FET T4 are provided in series, and a source S of the Nch FET T3 and a drain D of the Nch FET T4 are connected at a node 2b. Moreover, a drain D of the Nch FET T1 and a drain D of the Nch FET T3 are connected at a node 2c, and a source S of the Nch FET T2 and a source S of the Nch FET T4 are connected at a node 2d.

The voltage to be applied between the source S and a gate G of each of the Nch FETs T1 to T4 is controlled by means of a gate voltage generation circuit (not shown) of each of the Nch FETs T1 to T4 to control the ON-OFF state of each of the Nch FETs T1 to T4 (the conductive-non-conductive state between the source S and the drain D) and thereby perform chopper operation. As a result, the level of the voltage to be applied to the DC motor M is made variable and therefore the current for energizing the DC motor M and the number of rotations thereof are made variable. Moreover, the Nch FETs T1 to T4 include parasitic diodes D11 to D14, respectively. When the energy of the DC motor M is to be regenerated to the battery Batt, these parasitic diodes D11 to D14 function as backward diodes (free-wheel diodes).

The DC motor M is connected at one end M1 to the node 2a of the Nch FETs T1 and T2 and connected at the other end M2 to the node 2b of the Nch FETs T3 and T4.

The main contactor MC is provided on the battery-positive-electrode-side line L1. The battery-positive-electrode-side line L1 connects a positive electrode terminal B1 of the battery Batt, and a battery-positive-electrode-side terminal 2e of the motor main control circuit section 2 (i.e. a terminal on the drain D side of the Nch FETs T1 and T3) to each other through the main contactor MC. The battery-negative-electrode-side line L2 connects a negative electrode terminal B2 of the battery Batt and a battery-negative-electrode-side terminal 2f of the motor main control circuit section 2 (i.e. a terminal on the source S side of the Nch FETs T2 and T4).

To bring the automated guided vehicle to an emergency stop, the supply of power from the battery Batt to the DC motor M needs to be securely stopped for safety, and the motor-drive main control circuit 11 is provided with the main contactor MC for this reason. Thus, to bring the automated guided vehicle to an emergency stop, this main contactor MC is opened (contacts MC1 and MC2 of the main contactor MC are opened). In this way, the supply of power from the battery Batt to the DC motor M can be securely stopped.

The diode D1 is provided on the battery-positive-electrode-side line L1 in parallel with the main contactor MC, and is connected its cathode K to the primary-side contact MC1 of the main contactor MC (i.e. one on the positive electrode terminal B1 side of the battery Batt).

This diode D1 is a component not used during normal travel of the automated guided vehicle. The main contactor MC is closed as shown in FIG. 1 during normal travel of the automated guided vehicle. As will be described later, in a case where the main contactor MC is opened to bring this traveling automated guided vehicle to an emergency stop, the energy of the DC motor M (inductance energy, or mechanical energy resulting from the rotation of the DC motor M) is converted into electric energy. The electric energy is regenerated to the battery Batt through the backward diodes D12 and D13 of the Nch FETs T2 and T3 in the motor main control circuit section 2 (the backward diodes D11 and D14 of the Nch FETs T1 and T4 during reverse rotation of the DC motor M), a source S of the Pch FET T11, a drain D of the Pch FET T11, and the diode D1.

The voltage smoothing capacitor C1 is connected at one end C1a to the battery-positive-electrode-side line L1 (i.e. the secondary-side contact MC2 of the main contactor MC and the battery-positive-electrode-side terminal 2e of the motor main control circuit section 2) and connected at the other end C1b to the battery-negative-electrode-side line L2 (i.e. the negative electrode terminal B2 of the battery Batt and the battery-negative-electrode-side terminal 2f of the motor main control circuit section 2), and thus is provided in parallel with the motor main control circuit section 2. This voltage smoothing capacitor C1 is configured to suppress voltage fluctuations due to fluctuations in the load on the power source (battery Batt) resulting from the chopper operation of the motor main control circuit section 2 (H-bridge circuit).

Moreover, in this embodiment, the Pch FET T11 is provided in series with the diode D1. The Pch FET T11 is connected at its source S to the secondary-side contact MC2 of the main contactor MC (i.e. the battery-positive-electrode-side terminal 2e of the motor main control circuit section 2) and connected at its drain D to the anode A of the diode D1. Note that reference numeral D21 in the drawing denotes the parasitic diode of the Pch FET T11.

The gate voltage generation circuit 12 includes a first resistor R11, a second resistor R12, a capacitor C11, and a Zener diode ZD11.

The first resistor R11 is connected at one end R11a to the source S of the Pch FET T11 (i.e. the secondary-side contact MC2 of the main contactor MC and the battery-positive-electrode-side terminal 2e of the motor main control circuit section 2) and connected at the other end R11b to a gate G of the Pch FET T11. The second resistor R12 is connected at one end R12a to the gate G of the Pch FET T11 and connected at the other end R12b to the battery-negative-electrode-side line L2 (i.e. the negative electrode terminal B2 of the battery Batt and the battery-negative-electrode-side terminal 2f of the motor main control circuit section 2). In other words, the first resistor R11 and the second resistor R12 are connected in series with respect to the secondary-side contact MC2 of the main contactor MC between the battery-positive-electrode-side line L1 and the battery-negative-electrode-side line L2.

The capacitor C11 is provided in parallel with the first resistor R11, and is connected at one end C11a to the source S of the Pch FET T11 (i.e. the secondary-side contact MC2 of the main contactor MC and the battery-positive-electrode-side terminal 2e of the motor main control circuit section 2) and connected at the other end C11b to the gate G of the Pch FET T11.

The Zener diode ZD11 is provided in parallel with the first resistor R11, and is connected at its cathode K to the source S of the Pch FET T11 (i.e. the secondary-side contact MC2 of the main contactor MC and the battery-positive-electrode-side terminal 2e of the motor main control circuit section 2) and connected at its anode A to the gate G of the Pch FET T11.

The first resistor R11 and the second resistor R12 of the gate voltage generation circuit 12 are configured to apply gate voltage (voltage between the source S and the gate G) to the gate G of the Pch FET T11 to turn on the Pch FET T11 (to allow conduction between the source S and the drain D), and their resistance ratio is set such that this gate voltage can be a suitable value.

The capacitor C11 of the gate voltage generation circuit 12 functions to prevent false firing of the Pch FET T11 due to fluctuations in voltage between the source S and the drain D of the Pch FET T11 (dV/dt).

The Zener diode ZD11 of the gate voltage generation circuit 12 functions as a voltage limiter to prevent the value of the voltage between the source S and the gate G of the Pch FET T11 from exceeding the rated value.

Next, the functions and the like of the Pch FET T11, its gate voltage generation circuit 12, and the like in the motor-drive main control circuit 11 will be described through separate cases, one being a case where the positive electrode and the negative electrode of the battery Batt are connected normally to the motor main control circuit section 2, and the other being a case where the positive electrode and the negative electrode of the battery Batt are connected to the motor main control circuit section 2 in reverse.

(Case Where Positive Electrode and Negative Electrode of Battery Are Connected Normally)

The motor-drive main control circuit 11 does not operate until the main contactor MC is closed (until the contacts MC1 and MC2 of the main contactor MC are closed). In this motor-drive main control circuit 11, power is not supplied from the battery Batt to the DC motor M, and the DC motor M does therefore not rotate.

Figure 2:
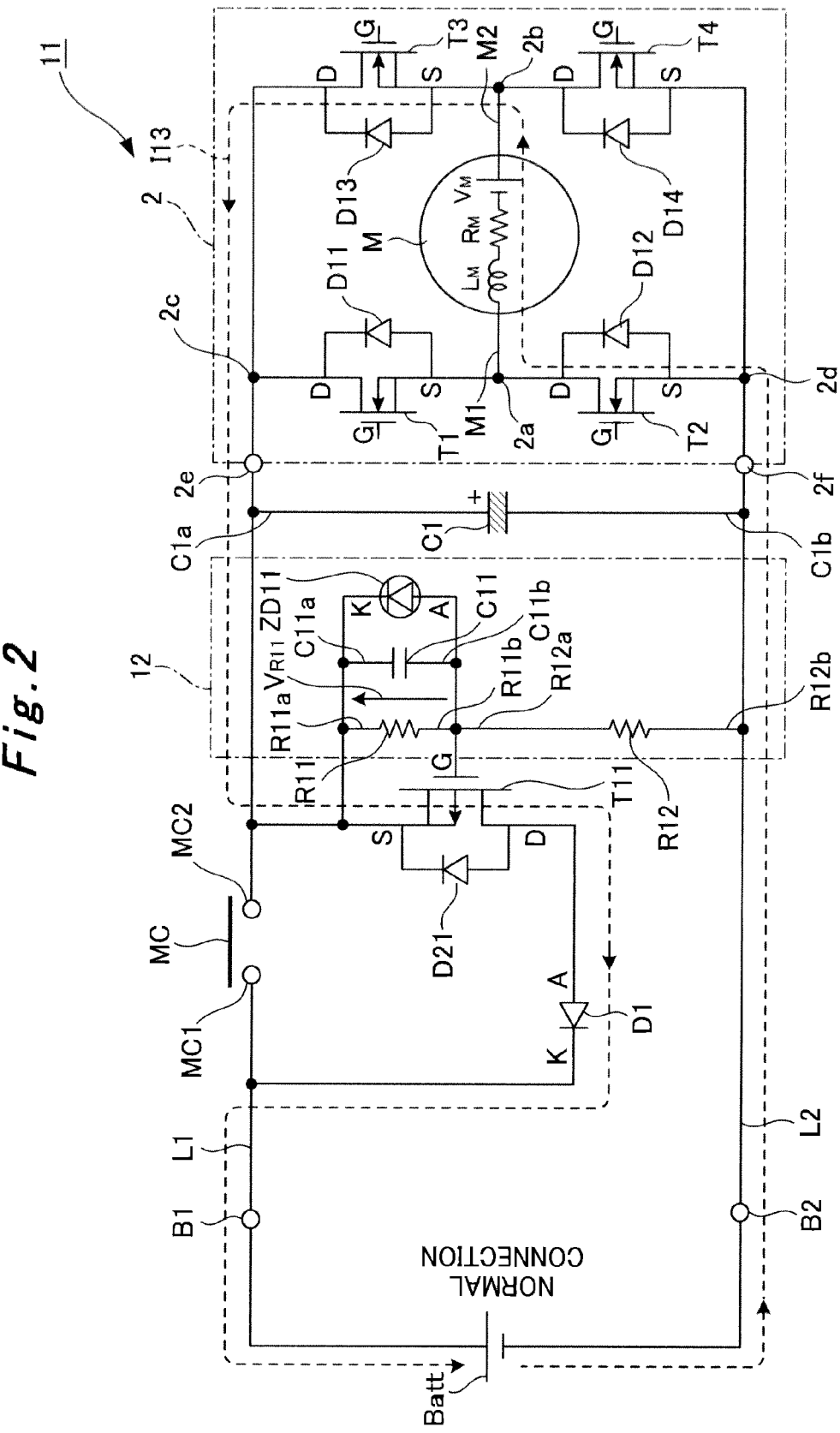
FIG. 2 is a configuration diagram of the motor-drive main control circuit for an automated guided vehicle according to the embodiment of the present invention, and is a diagram showing a state where the positive electrode and the negative electrode of the battery are connected normally and the main contactor is opened, thereby bringing the automated guided vehicle to an emergency stop.

FIG. 1 shows a state where the positive electrode and the negative electrode of the battery Batt are connected normally. FIG. 1 also shows a state after the main contactor MC is closed. FIG. 2 shows a state where the main contactor MC is opened while the automated guided vehicle is traveling with the main contactor MC closed (while the DC motor M is operating).

As shown in FIG. 1, once the main contactor MC is closed, the voltage $V_B$ of the battery Batt is applied to the secondary-side contact MC2 of the main contactor MC, so that the battery voltage $V_B$ is applied to the series circuit of the first resistor R11 and the second resistor R12. Thus, voltage $V_{R11}$ of the first resistor Rn obtained according to the resistance ratio between the first resistor R11 and the second resistor R12 is applied between the source S and the gate G of the Pch FET T11. As a result, gate voltage $V_{R11}$ is generated between the source S and the gate G of the Pch FET T11, so that the ON resistance value between the source S and the drain D of the Pch FET T11 decreases, thereby changing the state between the source S and the drain D of the Pch FET T11 to the ON state (conductive state).

Figure 5:
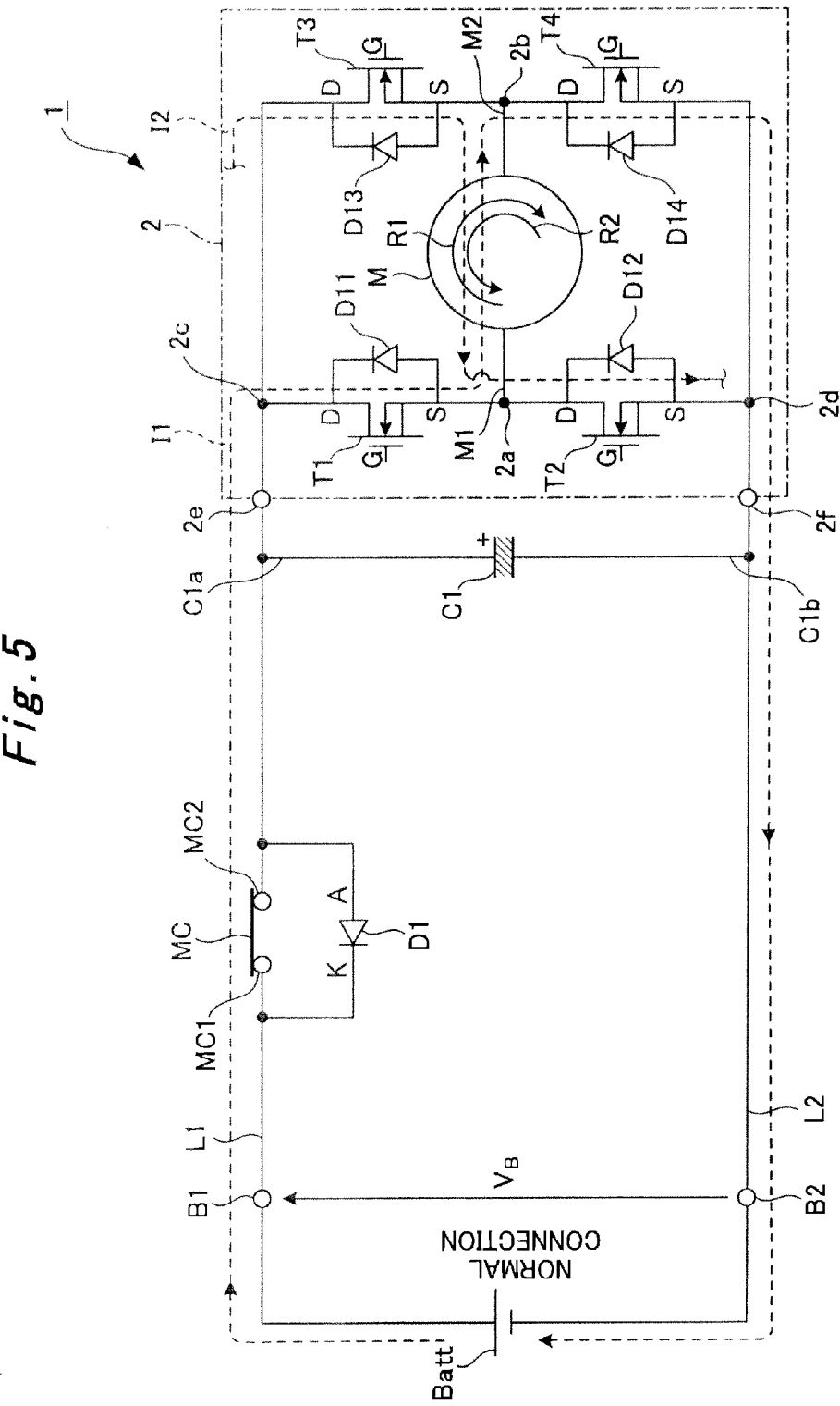
FIG. 5 is a configuration diagram of a conventional motor-drive main control circuit for an automated guided vehicle, and is a diagram showing a state where the positive electrode and the negative electrode of a battery are connected normally and a main contactor is closed, thereby allowing the automated guided vehicle to travel.
Figure 6:
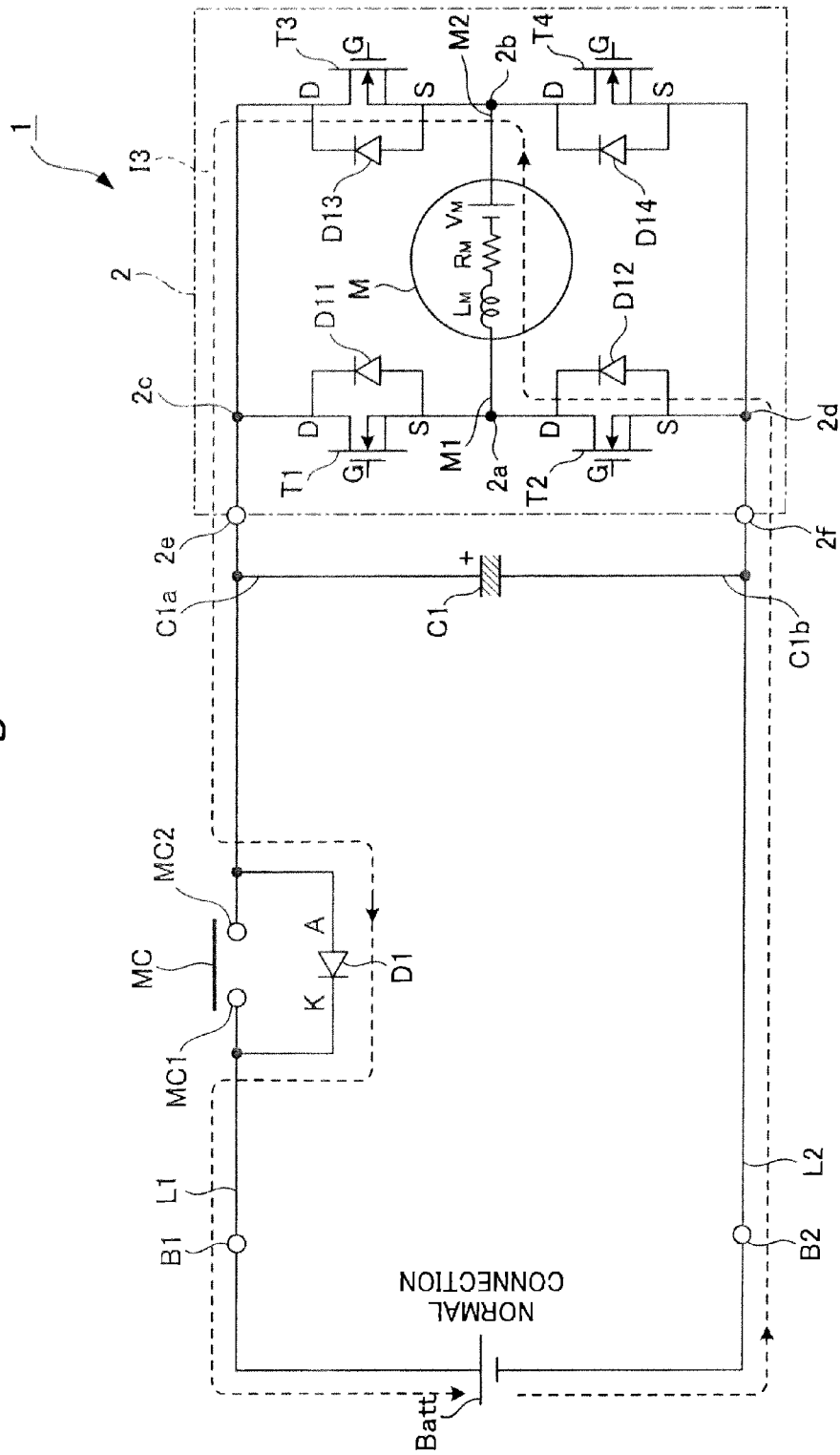
FIG. 6 is a configuration diagram of the conventional motor-drive main control circuit for an automated guided vehicle, and is a diagram showing a state where the positive electrode and the negative electrode of the battery are connected normally and the main contactor is opened, thereby bringing the automated guided vehicle to an emergency stop.
Figure 7:
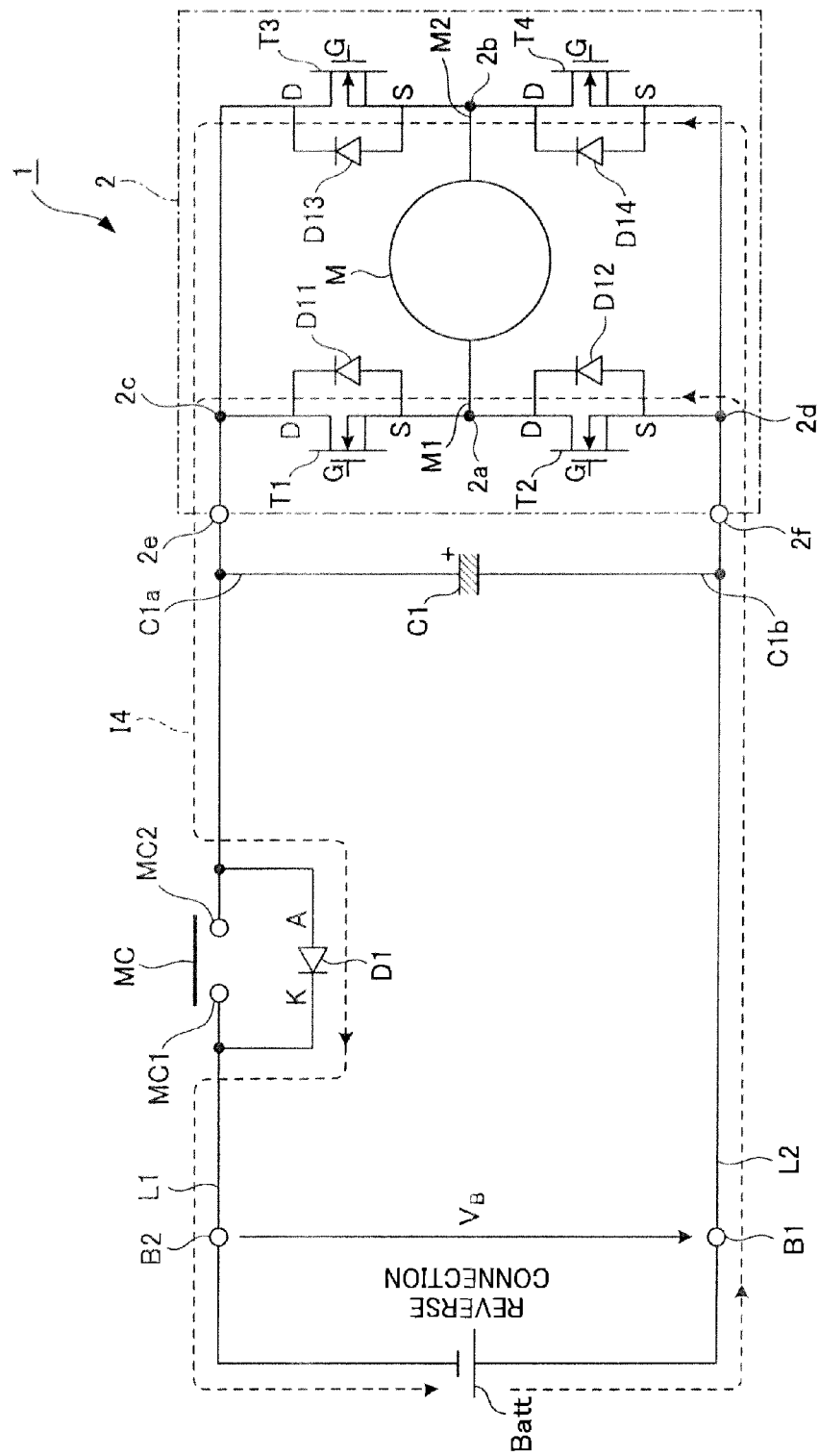
FIG. 7 is a configuration diagram of the conventional motor-drive main control circuit for an automated guided vehicle, and is a diagram showing a state where the positive electrode and the negative electrode of the battery are connected in reverse and the main contactor is opened (the motor-drive main control circuit does not operate).

Here, the motor-drive main control circuit 11 of this embodiment, too, is in the same state as the state of the conventional motor-drive main control circuit 1 where only the diode D1 is connected in parallel to the main contactor MC (see FIG. 5). Thus, similar operations and effects to those of the conventional motor-drive main control circuit 1 can be achieved.

Specifically, when the main contactor MC is closed and the Nch FETs T1 and T4 of the motor main control circuit section 2 are turned on, current flows in the forward direction like I11 shown in FIG. 1 and energizes the DC motor M, thereby rotating the DC motor M in the forward direction like R11 shown in FIG. 1. Accordingly, the automated guided vehicle travels forward. On the other hand, when the Nch FETs T2 and T3 are turned on, current flows in the reverse direction like I12 shown in FIG. 1 and energizes the DC motor M, thereby rotating the DC motor M in the reverse direction like R12 shown in FIG. 1. Accordingly, the automated guided vehicle travels backward. Moreover, the current for energizing the DC motor M and the number of rotations thereof vary due to the chopper operation of the motor main control circuit section 2 (H-bridge circuit).

Figure 8:
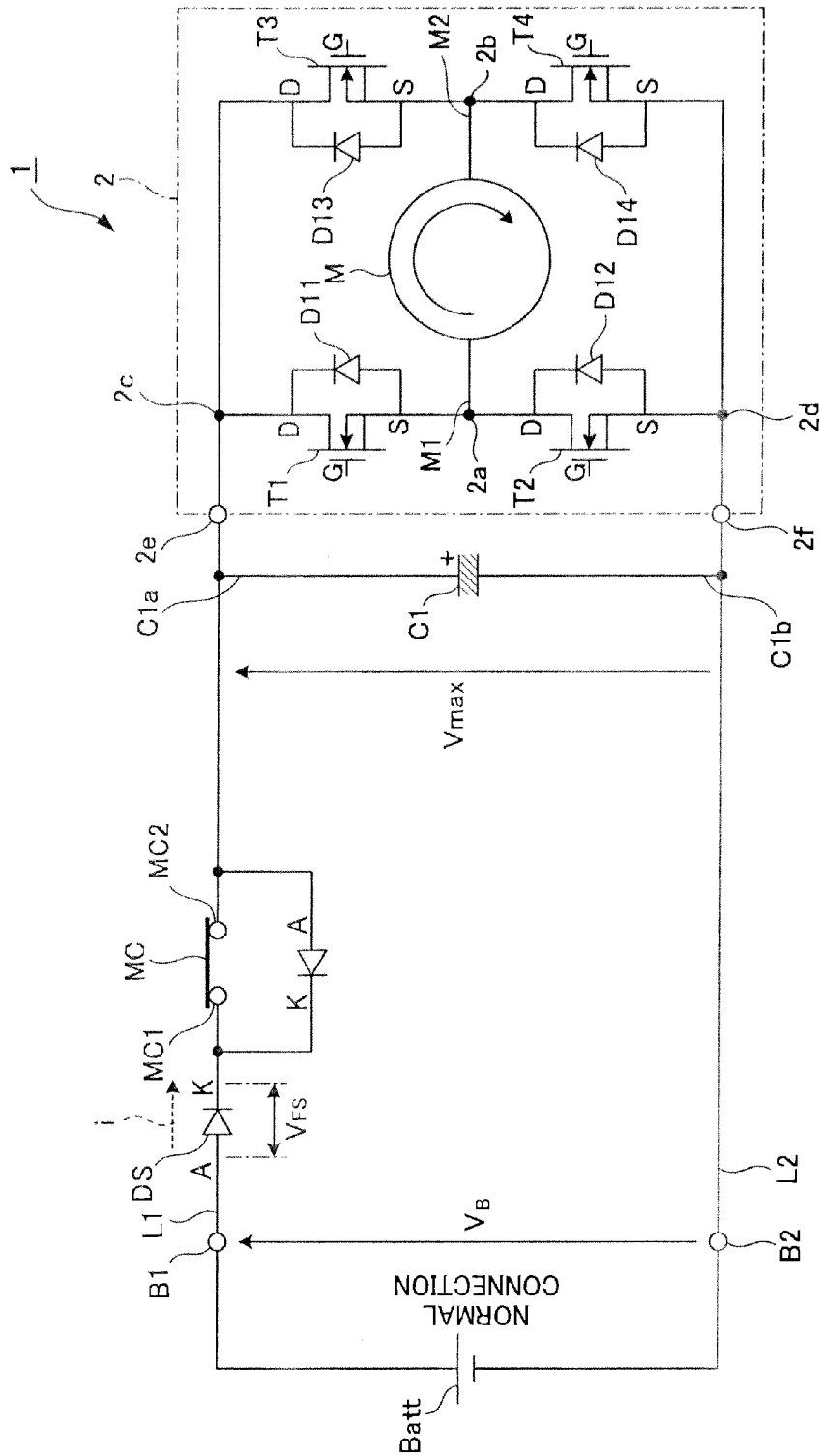
FIG. 8 is a diagram showing another configuration example of the conventional motor-drive main control circuit for an automated guided vehicle, and is a diagram showing a state where the positive electrode and the negative electrode of the battery are connected normally and the main contactor is closed, thereby allowing the automated guided vehicle to travel.
Figure 9:
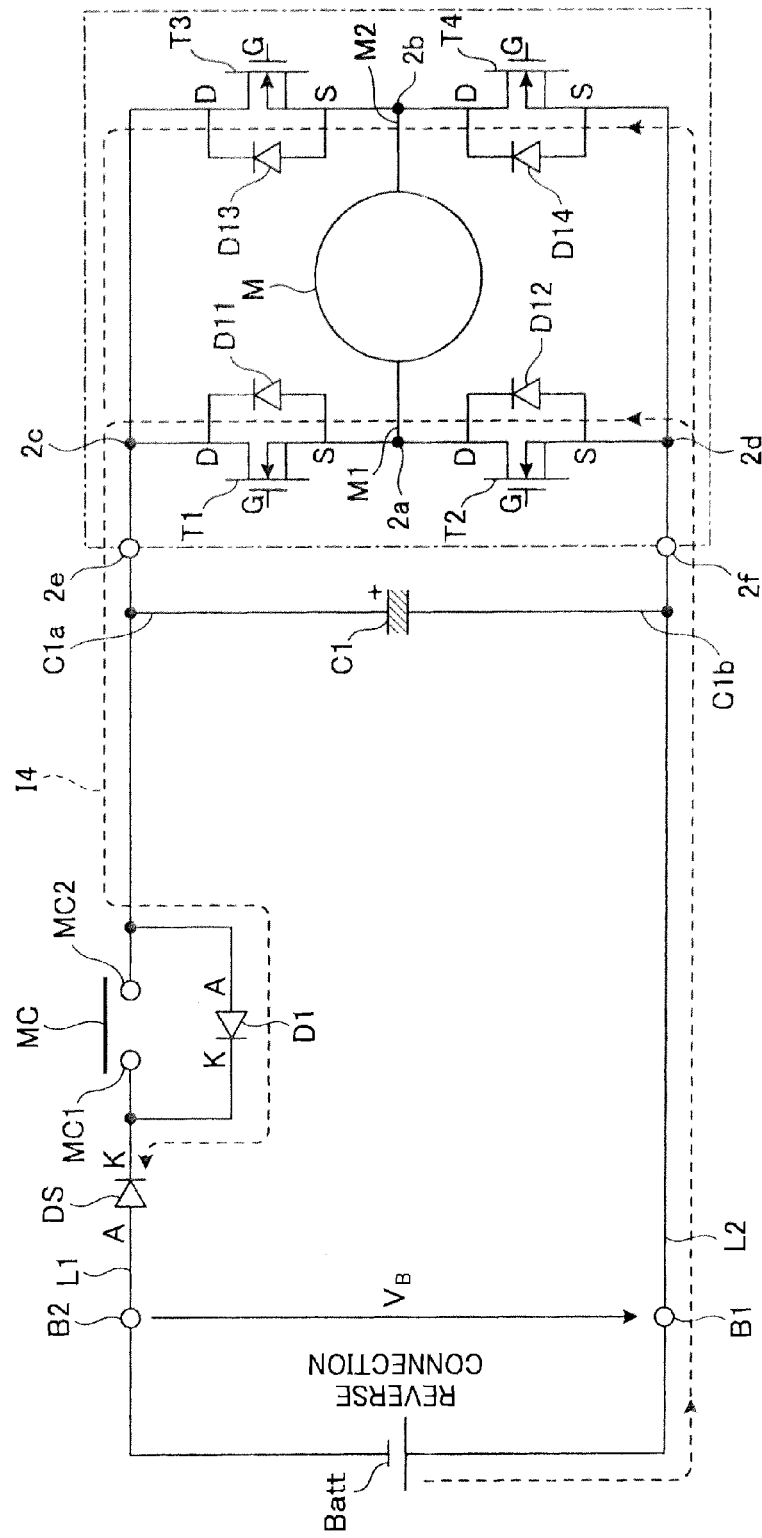
FIG. 9 is a diagram showing the other configuration example of the conventional motor-drive main control circuit for an automated guided vehicle, and is a diagram showing a state where the positive electrode and the negative electrode of the battery are connected in reverse and the main contactor is opened, thereby bringing the automated guided vehicle to an emergency stop.

Moreover, in this state, the motor-drive main control circuit 11 of this embodiment does not experience the unnecessary voltage drop which occurs in the case where the diode DS is provided between the positive electrode terminal B1 of the battery Batt and the main contactor MC (see FIG. 8). Thus, the energy loss due to this voltage drop does not occur either.

Moreover, while this automated guided vehicle is traveling, i.e. while the state between the source S and the drain D of the Pch FET T11 is the ON state (conductive state), this ON state (conductive state) between the source S and the drain D of the Pch PET T11 is maintained in a case where the main contactor MC is opened (the contacts MC1 and MC2 of the main contactor MC are opened) as shown in FIG. 2 due to emergency stop operation of the automated guided vehicle or the like. For this reason, the energy of the DC motor M (inductance energy, or mechanical energy resulting from the rotation of the DC motor M) is converted into electric energy and, like I13 shown in FIG. 2, regenerated to the battery Batt through the backward diodes D12 and D13 of the Nch FETs T2 and T3 in the motor main control circuit section 2 (the backward diodes D11 and D14 of the Nch FETs T1 and T4 during reverse rotation of the DC motor M), the source S of the Pch FET T11, the drain D of the Pch FET T11, and the diode D1.

(Case Where Positive Electrode and Negative Electrode of Battery Are Connected in Reverse)

Figure 3:
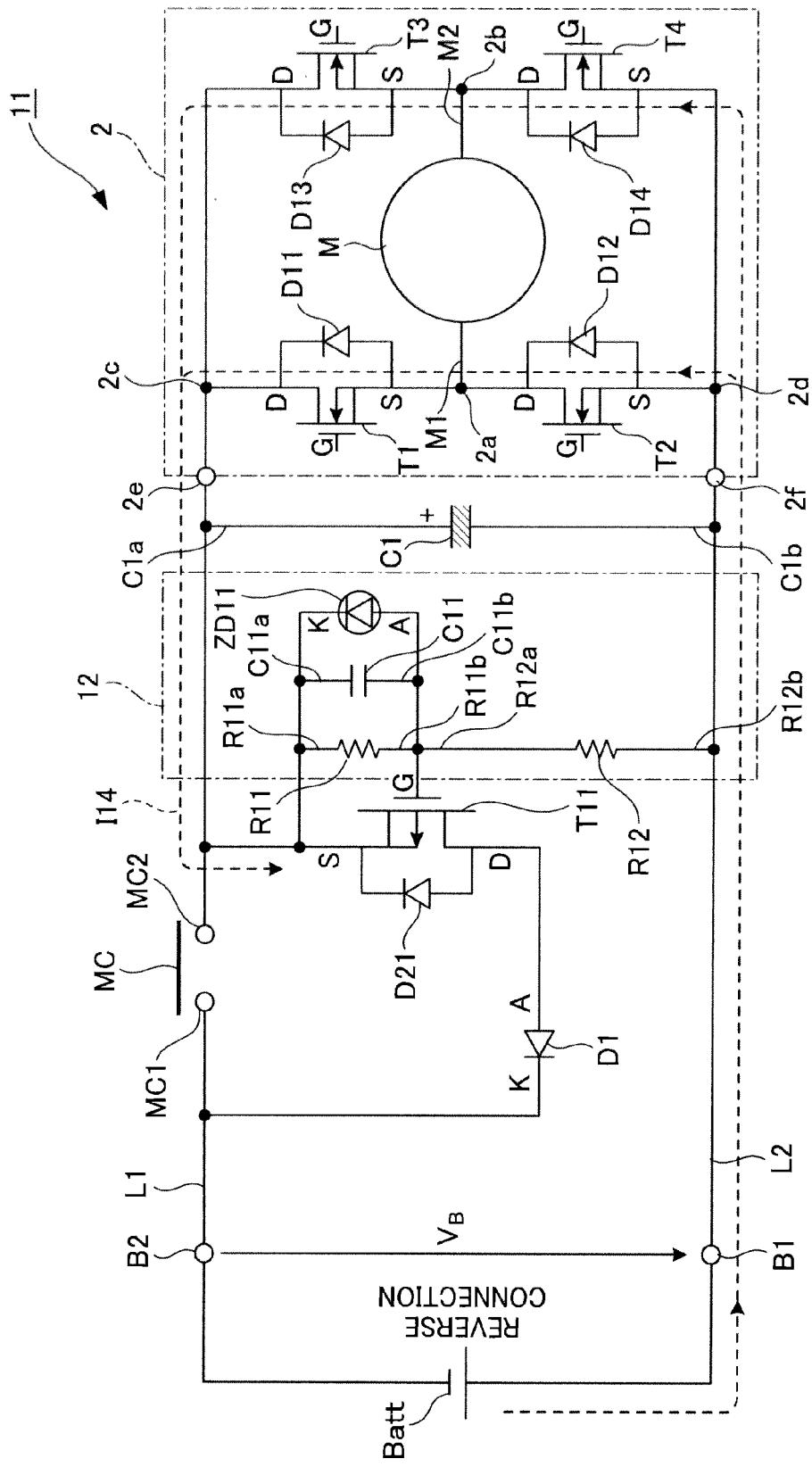
FIG. 3 is a configuration diagram of the motor-drive main control circuit for an automated guided vehicle according to the embodiment of the present invention, and is a diagram showing a state where the positive electrode and the negative electrode of the battery are connected in reverse and the main contactor is opened (the motor-drive main control circuit does not operate).

FIG. 3 shows a state where the positive electrode and the negative electrode of the battery Batt are connected in reverse.

As shown in FIG. 3, the main contactor MC remains opened since the motor-drive main control circuit 11 does not operate.

In this state, the voltage $V_B$ of the battery Batt is applied to the source S of the Pch FET T11 in the forward direction and to the drain D of the Pch FET T11 in the reverse direction like I14 in FIG. 3. Thus, the one end R11a of the first resistor R11 and the other end R12b of the second resistor R12 (i.e. the battery-positive-electrode-side line L1 at the secondary-side contact MC2 of the main contactor MC and the battery-negative-electrode-side line L2) are at the same potential, and therefore the source S of the Pch FET T11 and the gate G of the Pch FET T11 are at the same potential. Accordingly, no voltage is applied between the source S and the gate G of the Pch FET T11, so that the ON resistance value between the source S and the drain D of the Pch FET T11 does not decrease and the OFF state (non-conductive state) between the source S and the drain D of the Pch FET T11 is maintained.

Hence, the Pch FET T11 can block the short circuit that occurs in the conventional practice from the positive electrode of the battery Batt through the backward diodes D11 to D14 of the Nch FETs T1 to T4 in the motor main control circuit section 2 and the diode D1 to the negative electrode of the battery Batt. Accordingly, it is possible to prevent excessively large short-circuit current from flowing in the motor-drive main control circuit 11 and excessively heating and burning out components (elements such as the Nch FETs) and wiring materials forming the motor-drive main control circuit 11, and therefore protect the motor-drive main control circuit 11.

Figure 4:
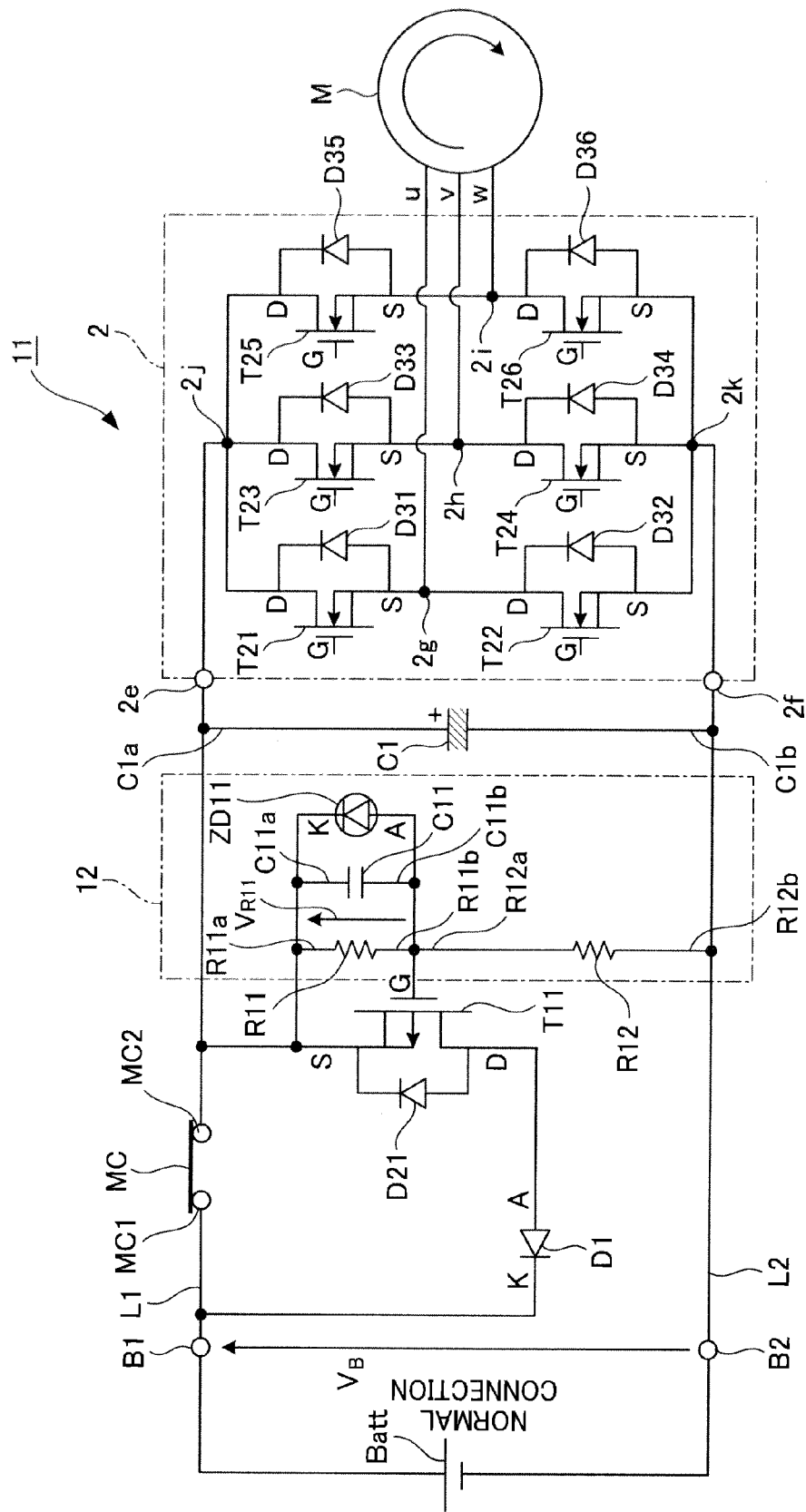
FIG. 4 is a configuration diagram of the motor-drive main control circuit for an automated guided vehicle according to the embodiment of the present invention, and is a diagram showing another configuration example of a motor main control circuit section (three-phase bridge circuit).

Note that in the case of the DC motor M, an H-bridge circuit formed by multiple switching elements (such as FETs and bipolar transistors) including backward diodes as shown in FIG. 1 is employed as the motor main control circuit section 2 (see FIG. 1); however, in the case of a brushless DC motor, an induction motor, or the like, a three-phase bridge circuit formed by multiple switching elements (such as FETs or bipolar transistors) including backward diodes as shown in FIG. 4 is employed as the motor main control circuit section 2.

Specifically, FIG. 4 shows a configuration example of the motor main control circuit section 2 using six Nch FETs T21 to T26. The Nch FET T21 and the Nch FET T22 are provided in series, and a source S of the Nch FET T21 and a drain D of the Nch FET T22 are connected at a node 2g. Moreover, the Nch FET T23 and the Nch FET T24 are provided in series, and a source S of the Nch FET T23 and a drain D of the Nch FET T24 are connected at a node 2h. Further, the Nch FET T25 and the Nch FET T26 are provided in series, and a source S of the Nch FET T25 and a drain D of the Nch FET T26 are connected at a node 2i. Furthermore, a drain D of the Nch FET T21, a drain D of the Nch FET T23, and a drain D of the Nch FET T25 are connected at a node 2j, and a source S of the Nch FET T22, a source S of the Nch FET T24, and a source S of the Nch FET T26 are connected at a node 2k.

The voltage to be applied between the source S and a gate G of each of the Nch FETs T21 to T26 is controlled by means of a gate voltage generation circuit (not shown) of each of the Nch FETs T21 to T26 to control the ON-OFF state of each of the Nch FETs T21 to T26 (the conductive-non-conductive state between the source S and the drain D). As a result, the frequency and the level of the three-phase AC power to be applied to a motor M such as a brushless DC motor or an induction motor can be made variable and therefore the current for energizing the motor M and the number of rotations thereof can be made variable. Moreover, the Nch FETs T21 to T26 include parasitic diodes D31 to D36, respectively. When the energy of the motor M is to be regenerated to the battery Batt, these parasitic diodes D31 to D36 function as backward diodes (free-wheel diodes).

The motor M is connected to the node 2g of the Nch FETs T21 and T22, the node 2h of the Nch FETs T23 and T24, and the node 2i of the Nch FETs T25 and T26.

Note that the other features of the configuration are similar to those in FIG. 1. Thus, specific description of thereof is omitted here.

<Operations and Effects>

The motor-drive main control circuit 11 of this embodiment can achieve the following operations and effects since, as described above, the motor-drive main control circuit 11 includes the battery Batt, the main contactor MC, the motor main control circuit section 2 to which the motor M is connected and which is an H-bridge circuit or a three-phase bridge circuit including multiple switching elements (such as the Nch FETs T11 to T14 or Nch FETs T21 to T26) including the backward diodes D11 to D14 or D31 to D36, the battery-positive-electrode-side line L1 connecting the positive electrode terminal B1 of the battery Batt and the battery-positive-electrode-side terminal 2e of the motor main control circuit section 2 to each other through the main contactor MC, the battery-negative-electrode-side line L2 connecting the negative electrode terminal B2 of the battery Batt and the battery-negative-electrode-side terminal 2f of the motor main control circuit section 2 to each other, and the diode D1 provided in parallel with the main contactor MC and connected at the cathode K to the primary-side contact MC1 of the main contactor MC, and the motor-drive main control circuit 11 is characterized by including: the Pch FET T11 provided in series with the diode D1, and connected at the source S to the secondary-side contact MC2 of the main contactor MC and connected at the drain D to the anode A of the diode D1; and the gate voltage generation circuit 12 for the Pch FET T11, the gate voltage generation circuit 12 including the first resistor R11 connected at the one end R11a to the source S of the Pch FET T11 and connected at the other end R11b to the gate G of the Pch FET T11, and the second resistor R12 connected at the one end R12a to the gate G of the Pch FET T11 and connected at the other end R12b to the battery-negative-electrode-side line L2.

(1) Specifically, in the case where the positive electrode and the negative electrode of the battery Batt are connected normally, when the main contactor MC is closed, the voltage $V_B$ of the battery Batt is applied to the secondary-side contact MC2 of the main contactor MC, so that the voltage $V_{R11}$ of the first resistor R11 obtained according to the resistance ratio between the first resistor R11 and the second resistor R12 is applied between the source S and the gate G of the Pch FET T11 and therefore the gate voltage $V_{R11}$ is generated between the source S and the gate G of the Pch FET T11. Thus, the ON resistance value between the source S and the drain D of the Pch FET T11 decreases, and the state between the source S and the drain D of the Pch FET T11 changes to the ON state (conductive state).

Accordingly, the same state as the state of the conventional motor-drive main control circuit where only the diode D1 is connected in parallel to the main contactor MC is obtained. Thus, operations and effects similar to those of the conventional motor-drive main control circuit 1 can be achieved.

Moreover, there is not any unnecessary voltage drop which occurs in the case where the diode DS is provided between the positive electrode terminal B1 of the battery Batt and the main contactor MC (see FIG. 8), and therefore the energy loss due to this voltage drop does not occur either. Accordingly, the electric energy of the battery Batt can be effectively utilized. In addition, the number of rotations of the motor M does not decrease. Also, no cooling component is provided and the device volume does therefore not increase.

(2) Moreover, in the case where the positive electrode and the negative electrode of the battery Batt are connected normally, when the main contactor MC is opened while the state between the source S and the drain D of the Pch FET T11 is the ON state (conductive state), the ON state (conductive state) between the source S and the drain D of the Pch FET T11 is maintained. Thus, the energy of the motor M can be regenerated to the battery Batt through the backward diodes D11 to D14 of the Nch FETs T1 to T4 in the motor main control circuit section 2 (or the backward diodes D31 to D36 of the Nch FETs T21 to T26), the source S of the Pch FET T11, the drain ID of the Pch FET T11, and the diode D1.

(3) In the case where the positive electrode and the negative electrode of the battery Batt are connected in reverse, when the main contactor MC is opened, the voltage $V_B$ of the battery Batt is applied to the source S of the Pch FET T11 in the forward direction and to the drain D of the Pch FET T11 in the reverse direction. Thus, the source S of the Pch FET T11 and the gate G of the Pch FET T11 are at the same potential, and no voltage is applied between the source S and the gate G of the Pch FET T11. Accordingly, the ON resistance value between the source S and the drain D of the Pch FET T11 does not decrease, and the OFF state (non-conductive state) between the source S and the drain D of the Pch FET T11 is maintained.

Hence, the Pch FET T11 can block the short circuit that occurs in the conventional practice from the positive electrode of the battery Batt through the backward diodes D11 to D14 of the Nch FETs T1 to T4 in the motor main control circuit section 2 and the diode D1 to the negative electrode of the battery Batt. Accordingly, it is possible to prevent excessively large short-circuit current from flowing in the motor-drive main control circuit 11 and excessively heating and burning out components (elements such as the Nch FETs) and wiring materials forming the motor-drive main control circuit 11, and therefore protect the motor-drive main control circuit 11.

Moreover, the motor-drive main control circuit 11 of this embodiment is characterized in that the gate voltage generation circuit 12 includes the capacitor C11 provided in parallel with the first resistor R11, and connected at the one end C11a to the source S of the Pch FET T11 and connected at the other end C11b to the gate G of the Pch FET T11. Thus, the capacitor C11 of the gate voltage generation circuit 12 can prevent false firing of the Pch FET T11 due to fluctuations in voltage between the source S and the drain D of the Pch FET T11 (dV/dt).

Furthermore, the motor-drive main control circuit 11 of this embodiment is characterized in that the gate voltage generation circuit 12 includes the Zener diode ZD11 provided in parallel with the first resistor R11, and connected at the cathode K to the source S of the Pch FET T11 and connected at the anode A to the gate G of the Pch FET T11. Thus, the Zener diode ZD11 of the gate voltage generation circuit 12 can prevent the value of the voltage $V_{R11}$ between the source S and the gate G of the Pch FET T11 from exceeding the rated value.

INDUSTRIAL APPLICABILITY

The present invention relates to a motor driving circuit to be installed in an automated guided vehicle or the like, and is beneficially employed for achieving protection against reverse connection of a battery in the motor driving circuit.

EXPLANATION OF REFERENCE NUMERALS

2 motor main control circuit section
2a to 2d node
2e battery-positive-electrode-side terminal
2f battery-negative-electrode-side terminal
2g to 2k node
11 motor-drive main control circuit
12 gate voltage generation circuit
Batt battery
MC main contactor
MC1 primary-side contact of main contactor
MC2 secondary-side contact of main contactor
D1 diode
A anode
K cathode
T11 Pch FET
D21 parasitic diode
S source
G gate
D drain
R11 first resistor
R11a one end of first resistor
R11b the other end of first resistor
R12 second resistor
R12a one end of second resistor
R12b the other end of second resistor
C11 capacitor
C11a one end of capacitor
C11b the other end of capacitor
ZD11 Zener diode
C1 voltage smoothing capacitor
C1a one end of voltage smoothing capacitor
C1b the other end of voltage smoothing capacitor
T1 to T4 Nch FET
T21 to T26 Nch FET
D11 to D14 backward diode (parasitic diode)
M DC motor, brushless DC motor, induction motor
M1 one end of DC motor
M2 the other end of DC motor

The invention claimed is:

1. A motor driving circuit including
    a battery,
    a contactor,
    a motor control circuit section to which a motor is connected and which is any one of an H-bridge circuit and a three-phase bridge circuit including a plurality of switching elements including backward diodes,
    a battery-positive-electrode-side line connecting a positive electrode terminal of the battery and a battery-positive-electrode-side terminal of the motor control circuit section to each other through the contactor,
    a battery-negative-electrode-side line connecting a negative electrode terminal of the battery and a battery-negative-electrode-side terminal of the motor control circuit section to each other, and
    a diode provided in parallel with the contactor, and connected at a cathode thereof to a primary-side contact of the contactor, characterized in that the motor driving circuit comprises:
    a Pch FET provided in series with the diode, and connected at a source thereof to a secondary-side contact of the contactor and connected at a drain thereof to an anode of the diode; and
    a gate voltage generation circuit for the Pch FET, the gate voltage generation circuit including
        a first resistor connected at one end thereof to a source of the Pch FET and connected at another end thereof to a gate of the Pch FET, and
        a second resistor connected at one end thereof to the gate of the Pch FET and connected at another end thereof to the battery-negative-electrode-side line.

2. The motor driving circuit according to claim 1, characterized in that the gate voltage generation circuit includes a capacitor provided in parallel with the first resistor, and connected at one end thereof to the source of the Pch FET and connected at another end thereof to the gate of the Pch FET.

3. The motor driving circuit according to claim 1, characterized in that the gate voltage generation circuit includes a Zener diode provided in parallel with the first resistor, and connected at a cathode thereof to the source of the Pch FET and connected at an anode thereof to the gate of the Pch FET.

4. The motor driving circuit according to claim 2, characterized in that the gate voltage generation circuit includes a Zener diode provided in parallel with the first resistor, and connected at a cathode thereof to the source of the Pch FET and connected at an anode thereof to the gate of the Pch FET.

* * * * *